Patented Apr. 2, 1946

2,397,575

UNITED STATES PATENT OFFICE 2,397,575

METHOD FOR RECOVERING COPPER VALUE FROM DILUTE SOLUTIONS OF COPPER SALTS

Howard L. Tiger, New York, N. Y., and Paul C. Goetz, Mount Holly, N. J., assignors to The Permutit Company, New York, N. Y., a corporation of Delaware No Drawing. Application August 9, 1938, Serial No. 223,940

1 Claim. (Cl. 23—97)

This invention relates to regenerating ion exchange zeolites; and it comprises an improvement in processes of removing and of exchanging ions existing in aqueous solution with the aid of zeolitic materials with occasional regeneration wherein regeneration is effected with volatile regeneration agents, such as constant boiling hydrochloric acid, ammonium carbonate, etc., and evaporation is utilized in recovering and reusing the excess of regenerating agent; it also comprises certain new chemical processes utilizing zeolites and volatile regenerants and delivering products in concentrated form; all as more fully hereinafter set forth and as claimed.

Zeolitic softening of water by cation exchange is in extensive and successful use. A bed or body of a cation exchange silicate in small hard granules carrying exchangeable sodium is alternately exposed to a flow of hard water and to a solution of NaCl. The salt effects regeneration; it renews the supply of exchangeable sodium. The amount of salt used is more than that theoretically required, and it varies with different zeolites with a corresponding variation in the cost of softening. The softened water carries sodium bicarbonate, sulfate, etc., in amounts corresponding to the calcium and magnesium salts in the hard water. The sodium salts, in the amounts in which they are present, are immaterial for most purposes and are beneficial for some. Considered as a saline solution, ordinary waters rarely have a saline concentration above 0.01–0.1 per cent, or 100–1000 parts per million expressed as calcium carbonate and the amount of sodium salts in the softened water is of about the same order of magnitude; there is little difference in saline concentration.

In cation exchange, the zeolite effects exchange reactions metathetical in nature which may be written, calling the zeolite "Z," for example:

(1) $Ca(HCO_3)_2 + Na_2Z = 2NaHCO_3 + CaZ$
 (softening)
(2) $CaZ + 2NaCl = Na_2Z + CaCl_2$ (regeneration)

The algebraic sum of these two reactions amounts to:
(3) $Ca(HCO_3)_2 + 2NaCl = 2NaHCO_3 + CaCl_2$ the effect being a conversion of the salts imparting hardness to the water into sodium salts with conversion of common salt into chlorides of the hardening elements which are run to waste in the regeneration phase together with the necessary excess of common salt used in this phase of the process. The hard water is softened by expenditure of common salt effecting the softening metathesis represented in Equation 3.

"Carbonaceous zeolites" are certain recently introduced materials made from lignite, soft coal, etc., and having the properties of other commercial zeolites as regards cation exchange. Effective exchange agents can be made by drastic acid extraction of granulated lignite and various coals. Particularly efficient preparations can be made by sulfating lignite or soft coal, as hard resistant granules not disintegrating under the trying conditions in a pervious bed softener and having high exchange value per pound or per cubic foot.

These preparations lend themselves well to use as hydrogen zeolites; that is, zeolites stripped of metallic cations and regenerated with acid. These may be represented as $H_2Z$ in equations like those ante. Such zeolites remove the cations of salts in solution giving up hydrogen in exchange and producing free acid. They can be used for softening water and in so doing the saline concentration is lessened.

Another type of zeolites now coming into use are nitrogenous materials of basic nature with an action the reverse of that of hydrogen zeolites; they take up acids. Particularly good anion exchange materials (basic zeolites) can be made from aniline, hydrochloric acid, sodium chlorate and a vanadium catalyst. Saline solutions can be freed of solutes by using both types in succession. For example, a solution containing NaCl passed over a hydrogen zeolite gives up Na, setting free HCl. This HCl can then be withdrawn by passage of the water over the granulated basic zeolites. In regenerating the basic zeolite dilute alkali solutions are generally used, but we have found that volatile basic regenerants, such as a solution of ammonium carbonate, ammonium hydroxide, etc., are equally applicable and offer economies in use.

The modern carbonaceous zeolites, both of the acid type and the basic type, are not so sensitive to strong reagents as the older aluminosilicate. And we have found that by their use it is possible to extend the utility of exchange bodies into chemical manufacturing operations where, as a rule, concentrated liquids must be handled. The use of volatile reagents for regenerating aids considerably in these operations.

The present invention is particularly useful in the recovery of valuable metal salts from solutions containing the metal ions; recovery being in concentrated form. This can be done without undue dilution and the necessity for using great amounts of water in washing or in evaporation. For example, a waste water containing small amounts of copper can have the copper fixed by a hydrogen zeolite and the copper may then be stripped and the zeolite regenerated by "constant boiling" hydrochloric acid containing about 20 per cent HCl. The first portions of the extract thus obtained are concentrated copper chloride solution, with less copper in later portions. After stripping the zeolite is at once ready for re-use. The zeolitic action concentrates the copper for recovery. If the copper is present in the waste water as chloride the process effects a regenerating of copper chloride in the regeneration effluent. If desired, residual hydrochloric acid left in the regenerating effluent can be evaporated off. The extract may be concentrated by evaporation to obtain copper chloride and the vapors recondensed for use anew. This "constant boiling" acid, however, is merely exemplificatory of a wide variety of volatile reagents which may be used.

As volatile regenerants we can use acids, or bases, or salts and they can be recirculated through the zeolite bed by successive evaporation and condensation, that is, by distillation. The regenerants are used in considerable excess over quantities theoretically required to effect complete removal of the cations held by the zeolite, and evaporation of excess regenerant from the solutions containing the exchanged cations removes the excess which can be recycled through the bed. The result is a relatively concentrated solution from which valuable metal compounds can be readily recovered by crystallization, precipitation or other convenient means.

We have found that ammonia and volatile ammonium salts, such as the carbonates, are particularly effective as volatile regenerants for basic zeolites, while the volatile acids, such as hydrochloric and acetic acids and carbonic acid, are excellent regenerants for the hydrogen zeolites. Both the ammonium salts and the volatile acids are readily separated by evaporation from relatively concentrated solutions obtained in the regenerating phase of metathetic reactions.

We have used regeneration with volatile regenerants not only in the recovery of metal ions from waste solutions, but in the production of various chemicals. We have, for example, used it in converting common salt into sodium carbonate. This can be done in various ways, as by using a solution of ammonium carbonate as a regenerant or by using carbonic acid under pressure in the regeneration phase.

In an example of the metathetical conversion of common salt to sodium bicarbonate or carbonate, a sodium chloride solution is passed through a bed of hydrogen zeolite until the effluent shows an appreciable content of sodium chloride in addition to hydrochloric acid; after which the zeolite is extracted under pressure with a solution of carbonic acid obtained from products of combustion or from other convenient source. The hydrogen zeolite is thus regenerated and the regenerating effluent extract is a solution of sodium bicarbonate, from which the latter is readily recovered. Hydrochloric acid formed in the metathesis of common salt with carbonic acid may be recovered.

Similarly, sodium acetate can be converted into acetic acid and sodium bicarbonate or carbonate.

Following are specific examples of ion exchange metathesis according to our invention:

*Example 1.*—A previous bed of hydrogen zeolite, advantageously granular sulfated coal made by treating bituminous coal with a sulfating reagent and washing, is arranged in an acid-proof tank with the usual strainer system and supporting gravel layers for the bed. For the recovery of copper values in a waste solution containing 1000 parts per million copper as sulfate or chloride, the solution is passed downwardly through the zeolite bed, the effluent, substantially free of copper, being run to waste.

When an appreciable amount of copper appears in the effluent, the flow is stopped and the zeolite, now charged with copper, is regenerated to the hydrogen phase with a flow of 20 per cent hydrochloric acid, that is, the constant boiling mixture of HCl and water. For each cubic foot of zeolite two cubic feet of the acid are used in the regenerating phase. This is about four times the theoretical amount of acid required to strip the collected copper from the zeolite as copper chloride, restoring the hydrogen zeolite. During the regenerating phase the effluent solution is caught in an evaporating tank heated with steam coils. The excess acid is evaporated and condensed or distilled from the copper chloride solution as a constant boiling hydrochloric acid solution and the condensate is backcycled. After regeneration residual acid is rinsed from the bed, if this be desired, or left to go forward with the waste liquid from which copper is to be removed.

*Example 2.*—In the manufacure of soda ash, an ammonium zeolite is converted to a sodium zeolite by passing a 5 to 10 per cent sodium chloride solution through the zeolite bed until it no longer takes up sodium ions. The bed is then rinsed with water and regenerated by passing a 5 to 10 per cent ammonium carbonate solution through the bed in an amount about double that required to reconvert the sodium zeolite to ammonium zeolite. The sodium goes into solution as carbonate.

A zeolite of normal high exchange capacity converts about 2.4 pounds sodium chloride to sodium carbonate per cubic foot of zeolite with regeneration by a solution containing 4 pounds ammonium carbonate, which is double the amount theoretically required. For zeolites of smaller capacity, from 1 to 2 pounds ammonium carbonate per cubic foot of zeolite can be sufficient for regeneration.

The excess ammonium carbonate is boiled off and recovered for reuse from the regenerating effluent containing sodium carbonate. In the passage of the sodium chloride solution through the ammonium zeolite, the effluent contains ammonium chloride in solution. From this solution ammonia is recovered in known ways, as by treatment with lime.

The metathesis, by aid of the zeolite, of sodium chloride and ammonium carbonate into sodium carbonate and ammonium chloride is substantially quantitative; the recovery of ammonia from the chloride being also nearly complete. The burning of lime to be used in ammonia recovery provides a ready source of $CO_2$ for the ammonium carbonate volatile regenerant.

In regenerating with volatile regenerating agents in excess, as described, and recovering and reusing the excess, substantially complete separation of the regenerator from the recovered conversion product is possible. Recovery and reuse of the excess regenerating agent makes it possible to supply a large excess thereof and thus to obtain high capacity and efficient operation of the ion exchange cycle.

*Example 3.*—The chief use of the basic zeolites is in removing acid from water after a treatment of salt solutions with hydrogen zeolites. In one embodiment of this invention boiler water containing sodium as sulfate and chloride, as well as carbonate, is passed through a pervious bed of granular hydrogen zeolites. This sets free not only $CO_2$, which escapes, but also, some sulfuric acid and some hydrochloric acid. These are taken up in a granular bed of basic zeolites. The effluent water goes to the boiler. In this particular instance the amount of acid to be taken up is not great and the bed requires infrequent regeneration. In regeneration the bed may be exposed to ammonium carbonate as vapor or as solution. Acids go into solution as ammonium salts. With merely enough wash water to displace the ammonium salts, the bed is in condition for reuse.

What we claim is:

A cyclic process of recovering copper from dilute solutions of salts thereof comprising passing such a solution through a bed of a carbonaceous water insoluble cation exchanging material, regenerating said material with a sufficient excess of relatively concentrated hydrochloric acid to recover the copper therefrom, and distilling the regenerating effluent to recover the free hydrochloric acid therein for subsequent regeneration.

HOWARD L. TIGER.
PAUL C. GOETZ.